5 Sheets—Sheet 1.

J. M. BURTON.

RAILWAY CAR.

No. 11,254. Reissued July 19, 1892.

WITNESSES

Harry King.

S M Dorsett

INVENTOR

John M Burton

By F. G. Somes

Attorney

5 Sheets—Sheet 2.
J. M. BURTON.
RAILWAY CAR.
No. 11,254. Reissued July 19, 1892.
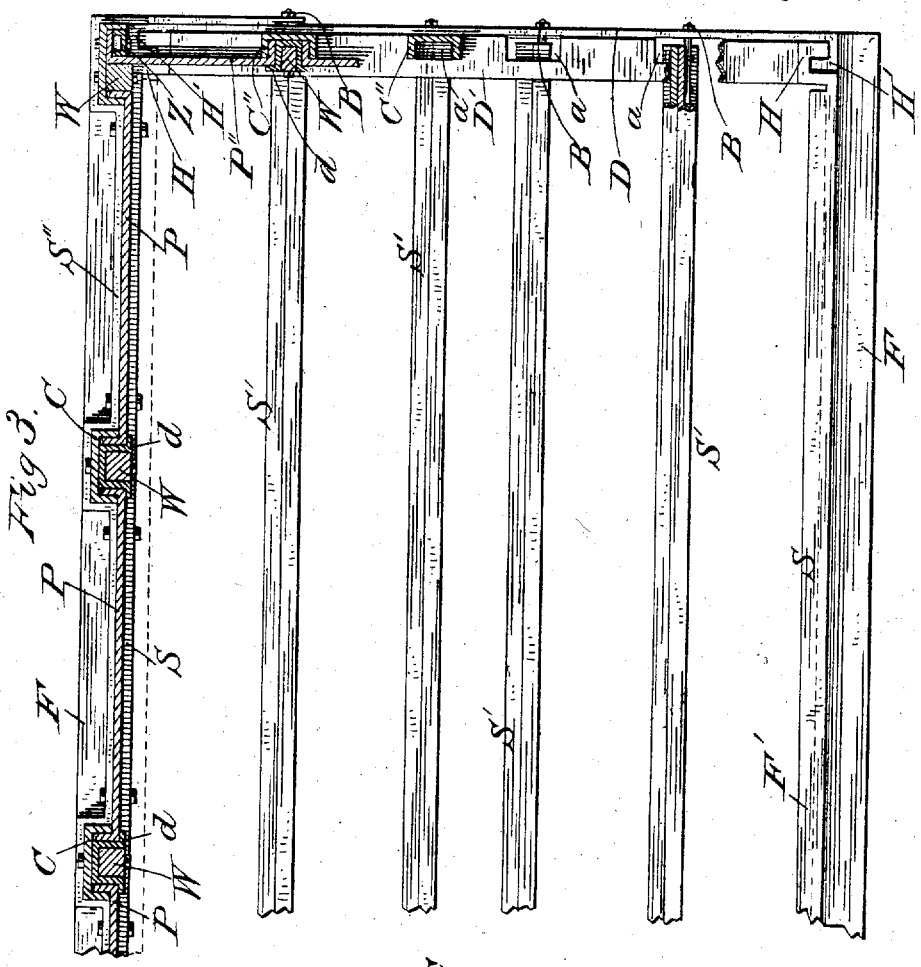
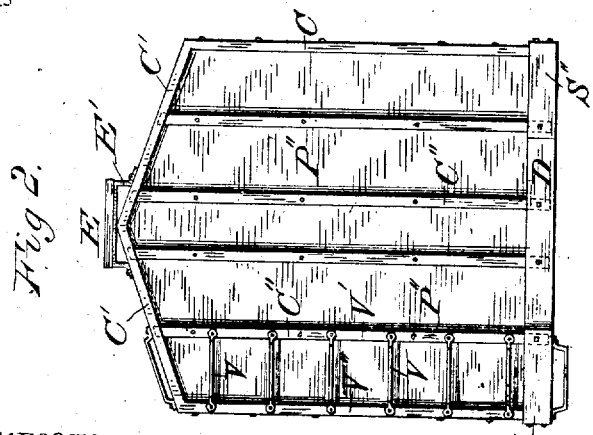
WITNESSES
Harry King
S. M. Dorsett
INVENTOR
John M. Burton
By F. C. Somes
Attorney 5 Sheets—Sheet 3.
J. M. BURTON.
RAILWAY CAR.
No. 11,254. Reissued July 19, 1892.
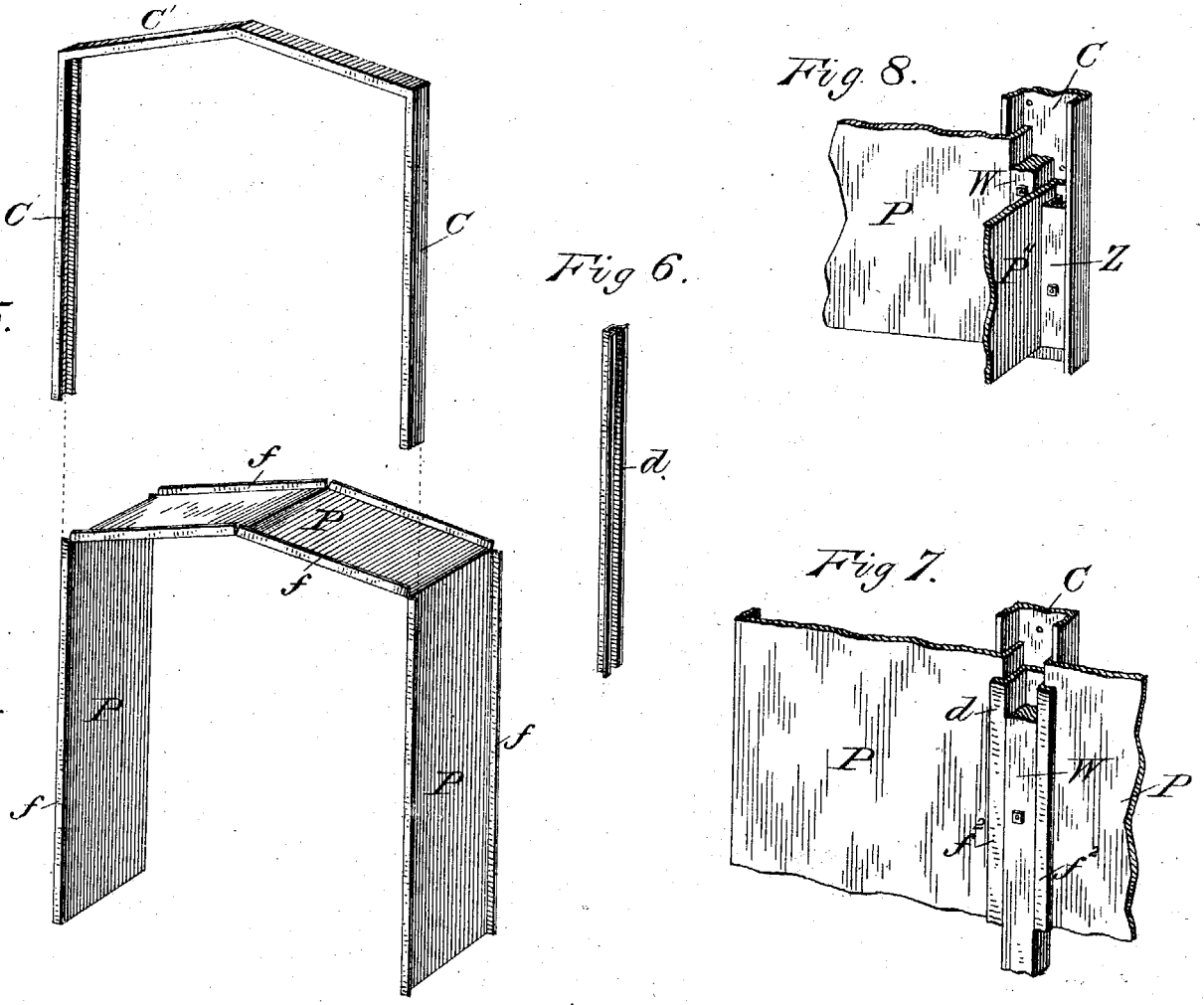
WITNESSES
Harry King.
S. M. Dorsett
INVENTOR
John M. Burton
By F. C. Somes
Attorney 5 Sheets—Sheet 4.
J. M. BURTON.
RAILWAY CAR.
No. 11,254. Reissued July 19, 1892.
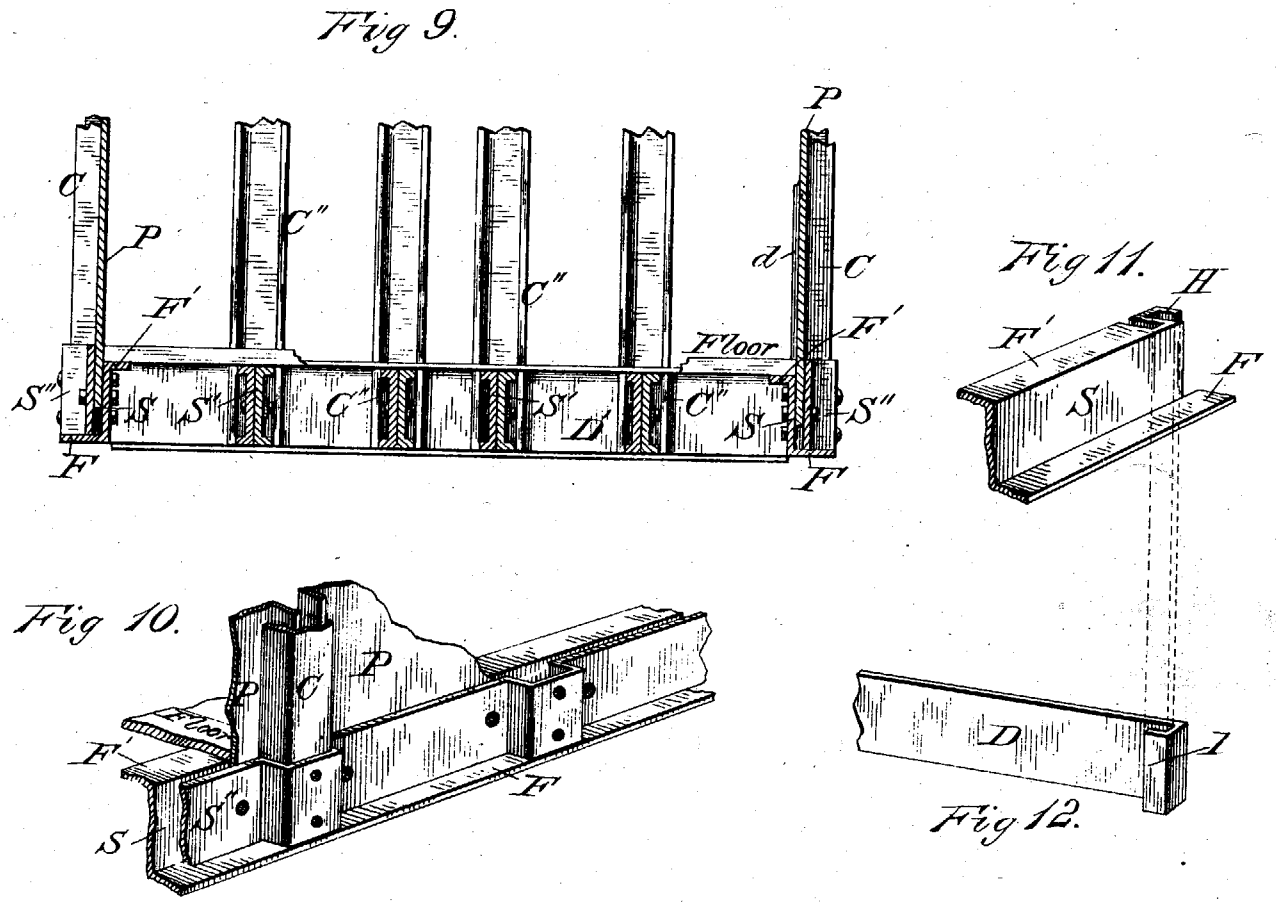
WITNESSES
Harry King.
S. M. Worsell
INVENTOR
John M. Burton,
By F. C. Somes,
Attorney

J. M. BURTON.

RAILWAY CAR.

No. 11,254. Reissued July 19, 1892.

WITNESSES

S. M. Dorsett

C. Offield.

INVENTOR

John M. Burton

By F. C. Jones

Attorney

UNITED STATES PATENT OFFICE.

JOHN M. BURTON, OF WICHITA, KANSAS.

RAILWAY-CAR.

SPECIFICATION forming part of Reissued Letters Patent No. 11,254, dated July 19, 1892.

Original No. 470,326, dated March 8, 1892. Application for reissue filed May 14, 1892. Serial No. 433,065.

*To all whom it may concern:*

Be it known that I, JOHN M. BURTON, a citizen of the United States of America, residing at Wichita, in the county of Sedgwick and State of Kansas, have invented certain new and useful Improvements in Railway-Cars, of which the following is a specification, reference being had therein to the accompanying drawings and the letters of reference thereon, forming a part of this specification, in which—

Figure 1:
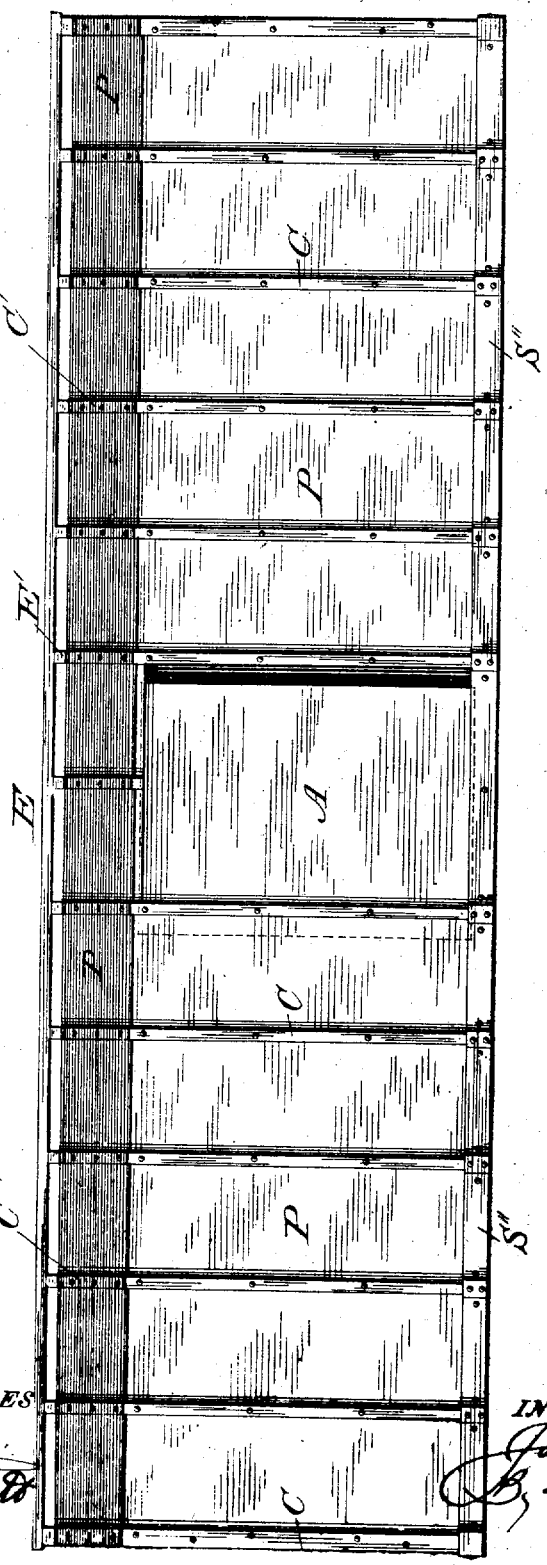
Figure 15:
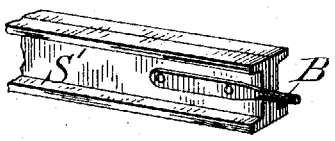
Figure 16:
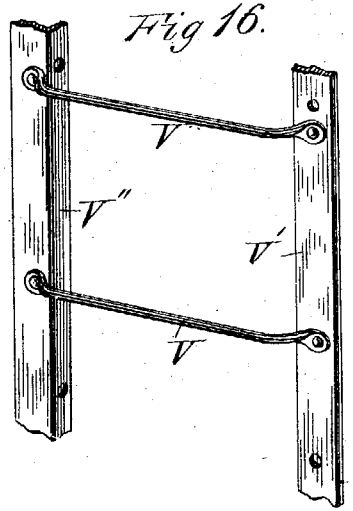

Figure 1 is a side elevation showing a side plan of the car; Fig. 2, an end elevation of the same; Fig. 3, a plan of the car-sills at one end of the car, also a section of the side and end sheathing and posts; Fig. 4, a detailed perspective of a single section of the combined side sheathing and roof-covering; Fig. 5, a similar view of a combined post and carling of the car construction having a portion of one post broken away; Fig. 6, a similar view of a channeled and flanged strip, such as are employed in securing the sheathing-plates and roof-plates into the channels of the posts and carlings when securing the parts together. Fig. 7 is a detailed perspective showing the construction and manner of uniting the side sheathing with the posts of the car, such construction being the same in the car-roof for uniting the roof portion of the plates with the carlings. Fig. 8 is a similar view of the corner construction of the car-walls. Fig. 9 is a cross-section of the lower portion of the car; and Figs. 10, 11, 12, 13, 14, 15, 16, 17, and 18 are detailed views of portions of the car construction to more fully present the form and manner of uniting parts when setting up a car.

This invention relates to certain improvements in railway-cars; and it consists, essentially, in the construction of the car from steel or other analogous material and the manner in which the several parts of the car are united and secured into position, which improvements are fully set forth and explained in the following specification and claims.

The object of this invention is to so construct the parts thereof, and especially the side and end walls and roof thereof, that they may be formed in duplicate quantities and afterward put together in sections and adapted to be held together by means of clamping-bolts.

Referring to the drawings, the lower frame of the car consists of the side-sill bars S′, the channeled end-sill bars D′, the reinforcing end-sill bars D, and the intermediate sills S′. The side sills S are formed at their lower portion with the outward laterally-extending flange F and at their upper portion with corresponding inwardly-extending flange F′, the former flanges being for the support or rest of the side posts of the car and the latter flanges for the support of the end portions of the flooring-plank of the car, and each end of each said sill is bent to form a locking-hook H. The supplemental end-sill bars D are bent at each end to form corresponding hooks H′ for locking with the side-sill bars, as shown in Fig. 3. The channeled bars D′ are arranged at the inner side of the supplemental end-sill bars D, with their back surface against said end-sill bars, and are recessed, as shown at *a*, through their upper flange, into which recesses the end posts *c″* of the car are stepped, so that the said posts will rest upon the lower flange of said bars with their channeled face presented toward the car interior. The intermediate sills S′ are composed of double-channeled steel bars arranged with their back surfaces together, and thus individually present the appearance of I-beams. These sills are each provided at each end with an attached screw-threaded shank B and are arranged with their ends placed in the channel of the end bars D′ and also within the channels of the end posts *c″*, which are stepped into said end-sill bars. The screw-threaded shanks of said intermediate sill-beams are passed through holes provided in the posts *c″* and through the two end-sill bars D′ D and have turned on their ends a nut, which nuts when turned into position firmly unite said parts. The side posts and carlings *c c′* of the car consist of channel-steel made in combined form by bending a channel-bar, as shown in Fig. 5, and a series of these combined side posts *c* and carlings *c′* are arranged at suitable regular intervals in the car-frame and rest upon the flanges F of the side-sill bars S. Each of the channeled bars, which constitute two corner-posts and the connecting-carling thereof, is of greater width than the channeled bars constituting the combined intermediate posts and carlings in order that the corner-posts may receive both the side and end sheathings and in order that the connecting-carling thereof may receive the upper ends of the intermediate end posts which extend into the channel of said carling, whereby the strength of the frame is increased.

P represents a combined side-sheathing and roof-covering plate having struck-up side flanges, said plate being bent to a form corresponding with the combined posts and carlings, as shown in Fig. 4. These plates are disposed side by side along the car-body, their flanges extending into the channels of the combined side posts and carlings, the portions of the plates between the posts constituting the side sheathing of the car and the portions thereof between the carlings constituting the roof-covering. These plates are held in position in the combined posts and carlings by any suitable means.

Figure 18:
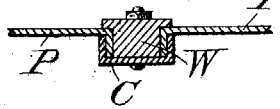

The means herein illustrated consist of strips which may be in the form of channel-bars, as shown in Figs. 6 and 7, or in the form of solid bars, as shown in Fig. 18. These strips are inserted in the channels of the posts and clamp the flanges of the combined sheathing and roofing plates against the flanges of the channeled posts or carlings, or both. When the channeled strips are employed the flanges $f^2$ thereof lap against the inner faces of the combined sheathing and roofing plates and assist in clamping them in position. Bolts or rivets pass through the posts and carlings and through the clamping-strips, whereby the posts are firmly united. The channeled posts and carlings shut over the edges of the combined sheathing and roofing plates and close the joints between said plates. When it is desired to line the car with an interior sheathing of wood, supplemental strips $w$, preferably composed of wood, are sunk in the channeled strips and such interior sheathing is nailed thereto.

The corners may be constructed as shown in Fig. 8, in which the sheathing P engages by the inner face of its flange one of the flanges of the corner-post and the other sheathing P′ by the inner edge of its flange engages the other flange of the corner-post. In this case the clamping-strip, which may be solid or flanged on one side only, is disposed in the channeled post between the outer face of the flange of the sheathing P and the inner face of the sheathing P′, a supplemental clamping-strip, as Z, being inserted between the inner face of the sheathing P′ and the other flange of the corner-post. The connection of the sheathing-plates P′ with the intermediate channeled end posts is the same as the connection of the side-sheathing plates with the channeled side posts. The side-sheathing plates P extend down below the top of the flanged side sills S and rest on the lower outward flange or step thereof. A clamping-plate S″, having recesses for securing the side posts, is placed over the extended lower portion of the side sheathing, and bolts passing through said clamping-plates, sheathing, and side sill serve to firmly fasten these parts together. Therec esses in the clamping-plate form sockets for the side posts. These side-clamping plates S″ may extend around the corner of the car, fitting the corner-posts thereof, and be fastened to the end sills, if desired, as shown in Fig. 3, and their extended end portions may be fastened by the usual bolts and truss-rods, whereby they assist in securing the end and side sills together and strengthen the lower frame.

The ladder disposed at each end of the car is composed, as herein shown, of a flat rail $v'$, an angle-iron rail $v''$, and rungs $v$, riveted to said rails. The flat rail fits against one of the intermediate end posts and the angle-iron rail fits over the outer corner of the corner-post. The same bolts which unite the inner clamping-strips with the post may pass through the ladder-rails and fasten the ladder to the car.

Figure 17:
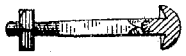
Figure 13:
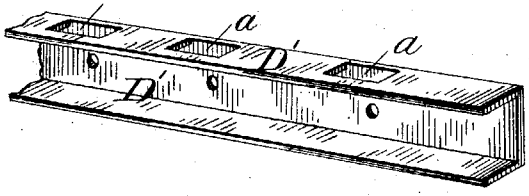
Figure 14:
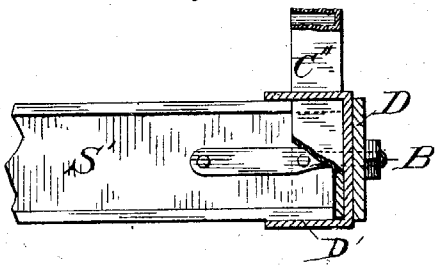

To provide the car with side doors, I have terminated two plates of side sheathing and one post $c$ at each side of the car at a point or line a little below the junction of the roof position, as shown in Fig. 1, and have provided sliding doors A, which are made of plates of steel, and otherwise need no further description. I have represented the car as provided with a running-board E, which is supported above the carlings $c'$ by means of saddles E′, as shown in Fig. 2. By such construction of car it becomes possible to make the several parts thereof in duplicate, and therefore in case of injury to a car it may readily and quickly be repaired by removing the injured part or parts, which may be done by simply removing the clamping-bolts at the injured portion of the car and substituting other parts for the injured ones; and, further, by such construction of combined posts and carlings and the manner of securing the said posts and carlings and the sheathing and roofing plates together the car presents a perfectly smooth and free interior, unobstructed by either posts or carlings within the car. The bolts used for securing the sheathing and the clamping-sill plates are formed with round heads concaved on their engaging side, as shown in Fig. 17, so that when they are drawn up by their nuts their head margin will slightly embed or cut into the metal, and thus make a close joint about their head, so water cannot get under them.

In the car construction I have shown the channeled and flanged strips $d$ as a means of holding the sheathing-plates in the car-posts, and have placed the wood fillers within said channeled strips.

I do not desire to confine myself to the strict letter of this construction, for the reason that the wood fillers $w$ may be made of sufficient size to occupy the place of said strips, and may further be provided with flanges like unto those of said strips, as is shown in Fig. 18, and therefore perform the same service by the use of wood entire or a part wood and a part metal.

Having thus described my invention, what I claim as new and useful, and desire to secure by Letters Patent, is as follows:

1. In a railway-car, the combination of the end-sill bars, the channeled bars arranged at the inner side of said end-sill bars and provided with post-recesses in the upper flanges thereof, the channeled end-wall posts stepped into said recesses, the intermediate sills arranged with their ends seated within said channel-bars and within the channel of the said wall-posts, said intermediate sills being provided with screw-threaded shanks extending through holes in said end posts and in said end-sill bars, and nuts on said shanks for locking said parts in position, substantially as set forth.

2. A railway-car one of the side sills of which is provided with an outward flange forming a step upon which one of the side walls rests and with an inward flange forming a step which serves as a support for the flooring-planks.

3. In the frame of a railway-car, the combination of a side sill provided with an outward flange, a side post supported on said flange, and a clamping-plate fastened to said side sill and provided with a loop engaging said post and clamping it in position.

4. In the frame of a railway-car, the combination of a side sill provided with an outward flange, a side post supported on said flange, a clamping-plate fastened to said side sill and provided with a loop engaging said post and clamping it in position, and a sheathing extending down between said clamping-plate and sill.

5. In the frame of a railway-car, the combination of a side sill provided with an outward flange, a channeled side post supported on said flange, a clamping-plate fastened to said side sill and provided with a loop engaging said post and clamping it in position, and a sheathing composed of plates having flanges engaging said channeled posts and extending down between said clamping-plate and sill.

6. In a railway-car frame, the combination of a side sill and an end sill, the meeting ends of said sills being provided with interlocking hooks, substantially as described.

7. In a railway-car frame, the combination of an end sill having inwardly-projecting flanges, the upper flange being provided with slots, a channeled end post stepped into said end sill through one of said slots; a longitudinal sill extending into the channeled end post between said flanges of the end sill, and means for fastening said post, substantially as described.

8. In a railway-car frame, the combination of an end sill having inwardly-projecting flanges, the upper flange being provided with slots, a channeled end post stepped into said end sill through one of said slots, a longitudinal sill extending into the channeled end post between said flanges of the end sill, said longitudinal sill being provided with a screw-threaded shank extending through said end sill, and a nut on said shank for clamping said posts together.

9. In a railway-car frame, the combination of a channeled corner-post, side sheathing provided with a flange engaging one of the flanges of said post, end sheathing provided with a flange engaging the other flange of said post, a filling-strip interposed between one flange of said post and one of said sheathings, and a filling-strip interposed between the opposite side of the same sheathing and the flange of the other sheathing, substantially as described.

10. In a railway-car frame, the combination of a channeled corner-post, side sheathing provided with a flange engaging one of the flanges of said post, end sheathing provided with a flange engaging the other flange of said post, a filling-strip interposed between one flange of said post and one of said sheathings, a filling-strip interposed between the opposite side of the same sheathing and the flange of the other sheathing, and an inner strip entering the channeled post and clamping-post and clamping the flanges of the sheathing-plates therein.

11. A railway-car consisting of the combination, with the lower frame and end walls, of a series of sections of metallic plates provided with side flanges and bent to form a combined side-wall sheathing and roof-covering, a series of combined metallic channeled posts and carlings arranged inclosing the flanges of said plates within their channels, and a series of supplemental flanged and channeled bars arranged within the channels of said combined posts and carlings and clamped therein by means of bolts for holding said plates, substantially as set forth.

12. In a railway-car frame, the combination of a channeled corner-post, side sheathing provided with a flange engaging one of the flanges of said post, end sheathing provided with a flange engaging the other flange of said post, a filling-strip interposed between one flange of said post and one of said sheathings, a filling-strip interposed between the opposite side of the same sheathing and the flange of the other sheathing, and an inner strip entering the channeled post and provided with flanges shutting over the inner faces of the sheathing-plates.

13. A railway-car provided with metallic channeled bars, each bar comprising two side-wall posts disposed on opposite sides of the car and a carling continuous with said posts, and metallic plates provided with side flanges and made to conform to the said combined posts and carlings and arranged with their flanges clamped within the channels of the combined posts and carlings, said plates forming a combined side-wall sheathing and roof-covering, substantially as set forth.

14. In a railway-car frame, the combination of an end wall composed of channeled posts, and sheathing-plates having side flanges clamped within said posts, and a channeled carling at the end of the car shutting over said end wall.

15. In a railway-car frame, the combination of a channeled carling at the end of the car-frame and an end wall the upper edge of which extends into the channel of said carling.

16. A railway-car provided with metallic channeled side-wall posts, in combination with metallic sheathing-plates provided with side flanges corresponding with the flanges of the posts and arranged within the channels of said posts, with corresponding flanged metallic channeled clamping-bars arranged within the channels of said posts and engaging said sheathing-plates, and with wooden bars arranged within said channeled clamping-bars, the whole being secured together by means of bolts arranged through said posts and bars, substantially as set forth.

17. A railway-car consisting of the combination, with the lower frame and end walls, of a series of combined metallic channeled side-wall posts and carlings, series of sections of metallic plates provided with side flanges and bent to form a combined side-wall sheathing and roof-covering and arranged with their flanges clamped within the channels of said combined posts and carlings, and the two-part sill-bars of the car, arranged clamping the lower end portion of said posts and plates between them, substantially as set forth.

18. A railway-car provided with the side walls and roof made in combined sections consisting of a series of combined metallic channeled posts and carlings and of a corresponding series of metallic plates bent to conform to the posts and carlings and provided with side flanges held clamped within the channels of said combined posts and carlings and with end walls consisting of similar parts and plates similarly united and clamped and arranged terminating at their upper end within the channel of the end carlings of the car, substantially as set forth.

19. A railway-car provided with end sills, with channel-iron end-wall posts stepped into mortises or recesses of said sills, and with the intermediate car-sills or stringers secured within said sills within the flanges of said posts, substantially as set forth.

20. A railway-car roof consisting of a series of inverted metallic U-shaped or channeled carlings and of a corresponding series of metallic plates provided with side flanges clamped within the hollows or channels of said carlings, substantially as set forth.

JOHN M. BURTON.

Witnesses:
SARAH MARTIN,
E. J. ROACH.